United States Patent
Lee et al.

(10) Patent No.: US 12,190,876 B2
(45) Date of Patent: Jan. 7, 2025

(54) DISPLAY DEVICE AND ARTIFICIAL INTELLIGENCE SYSTEM

(71) Applicant: LG ELECTRONICS INC., Seoul (KR)

(72) Inventors: Sangseok Lee, Seoul (KR); Jaekyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 332 days.

(21) Appl. No.: 17/639,505

(22) PCT Filed: Sep. 27, 2019

(86) PCT No.: PCT/KR2019/012655
§ 371 (c)(1),
(2) Date: Mar. 1, 2022

(87) PCT Pub. No.: WO2021/060590
PCT Pub. Date: Apr. 1, 2021

(65) Prior Publication Data
US 2022/0293099 A1    Sep. 15, 2022

(51) Int. Cl.
| | | |
|---|---|---|
| G10L 15/22 | (2006.01) | |
| G06F 3/16 | (2006.01) | |
| G06F 40/30 | (2020.01) | |
| G10L 15/18 | (2013.01) | |
| G10L 15/30 | (2013.01) | |
| H04N 21/422 | (2011.01) | |

(52) U.S. Cl.
CPC ............ *G10L 15/22* (2013.01); *G06F 3/167* (2013.01); *G06F 40/30* (2020.01); *G10L 15/1815* (2013.01); *G10L 15/30* (2013.01); *G10L 2015/223* (2013.01); *H04N 21/422* (2013.01)

(58) Field of Classification Search
USPC ...................................................... 704/1–504
See application file for complete search history.

(56) References Cited

U.S. PATENT DOCUMENTS

| | | | |
|---|---|---|---|
| 6,234,802 B1 | 5/2001 | Pella et al. | |
| 11,483,172 B2 * | 10/2022 | Yoon ................... | H04L 12/2816 |
| 2002/0155419 A1 | 10/2002 | Banerjee et al. | |

(Continued)

FOREIGN PATENT DOCUMENTS

| | | | | | |
|---|---|---|---|---|---|
| CN | 109831549 A | * | 5/2019 | ............. | G05B 15/02 |
| CN | 110325929 A | * | 10/2019 | ........... | G05B 19/042 |

(Continued)

*Primary Examiner* — Marcus T Riley
(74) *Attorney, Agent, or Firm* — Birch, Stewart, Kolasch & Birch, LLP

(57) ABSTRACT

A display device according to an embodiment of the present invention may include: a display unit which displays a content image; a microphone which receives a voice command of a user; a network interface unit for communicating with a natural language processing server and a search server; and a control unit which transmits the received voice command to the natural language processing server, receives intent analysis result information that indicates the intent of the user, which corresponds to the voice command, from the natural language processing server, and performs a function of the display device according to the received intent analysis result information.

8 Claims, 13 Drawing Sheets

(56) References Cited

U.S. PATENT DOCUMENTS

| | | | |
|---|---|---|---|
| 2005/0177376 A1* | 8/2005 | Cooper | G10L 15/065 |
| | | | 704/277 |
| 2012/0069131 A1* | 3/2012 | Abelow | G06Q 30/0601 |
| | | | 345/589 |
| 2013/0191122 A1* | 7/2013 | Mason | G10L 15/26 |
| | | | 704/231 |
| 2014/0111689 A1 | 4/2014 | Kim et al. | |
| 2014/0188486 A1* | 7/2014 | You | G10L 21/16 |
| | | | 704/275 |
| 2017/0103755 A1 | 4/2017 | Jeon et al. | |
| 2017/0206797 A1* | 7/2017 | Solomon | G06N 3/006 |
| 2019/0012198 A1 | 1/2019 | Ni et al. | |
| 2019/0019112 A1 | 1/2019 | Gelfenbeyn et al. | |
| 2020/0075008 A1* | 3/2020 | Kim | G06F 3/0482 |
| 2020/0090658 A1* | 3/2020 | Shin | G10L 15/22 |
| 2020/0092519 A1* | 3/2020 | Shin | G10L 17/00 |
| 2020/0341730 A1 | 10/2020 | Min et al. | |
| 2021/0043205 A1* | 2/2021 | Lee | G10L 15/22 |
| 2021/0194717 A1* | 6/2021 | Yoon | H04L 12/2816 |
| 2021/0383794 A1 | 12/2021 | Kim et al. | |
| 2022/0293099 A1* | 9/2022 | Lee | G10L 15/22 |
| 2022/0293106 A1* | 9/2022 | Kim | H04N 21/2665 |

FOREIGN PATENT DOCUMENTS

| | | | | |
|---|---|---|---|---|
| EP | 2 722 813 A1 | 4/2014 | | |
| EP | 3 157 007 A1 | 4/2017 | | |
| KR | 10-2014-0052155 A | 5/2014 | | |
| KR | 10-2017-0043055 A | 4/2017 | | |
| KR | 10-2018-0135817 A | 12/2018 | | |
| KR | 10-2019-0096308 A | 8/2019 | | |
| WO | WO-2018135743 A1 * | 7/2018 | | G06K 9/00335 |
| WO | WO 2019/135433 A1 | 7/2019 | | |
| WO | WO-2021060590 A1 * | 4/2021 | | G06F 3/167 |

* cited by examiner

FIG. 12

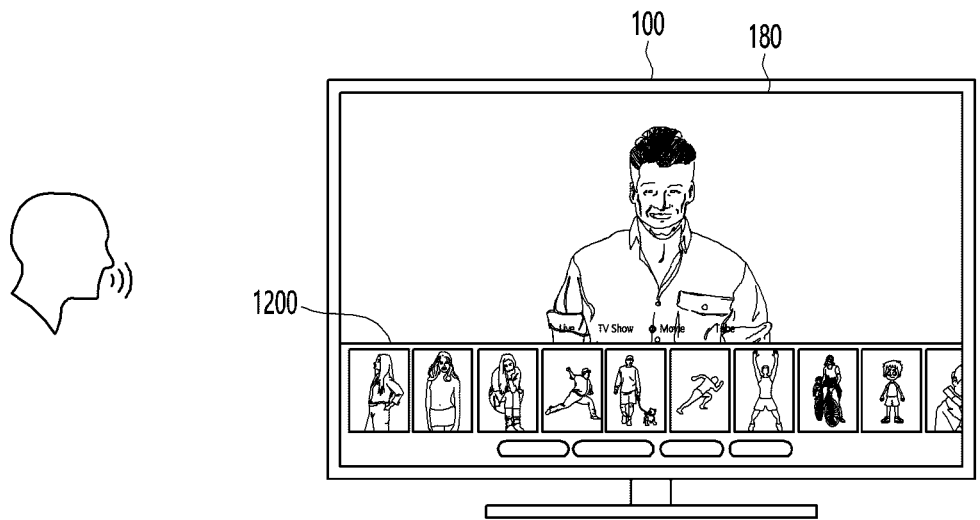

FIG. 13

| START WORD | SEARCH WORD | microphone UI | ORIGIN ui | result card |
|---|---|---|---|---|
| Hi KK | Weather | microphone UI of kk | ORIGIN ui of dd | result card of dd |
| | Search movies | microphone UI of kk | ORIGIN ui of kk | result card of kk |
| OK DD | Weather | microphone UI of dd | ORIGIN ui of dd | result card of dd |
| | Search movies | microphone UI of dd | ORIGIN ui of kk | result card of kk |

| 1401 | 1410 | 1430 | 1450 | 1470 |
|---|---|---|---|---|
| Language | STT | NLP | KK | DD |
| English | O | O | O | O |
| Korean | O | O | O | X |
| Japanese | O | X | X | X |

DISPLAY DEVICE AND ARTIFICIAL INTELLIGENCE SYSTEM

CROSS REFERENCE TO RELATED APPLICATION

This application is the National Phase of PCT International Application No. PCT/KR2019/012655, filed on Sep. 27, 2019, which is hereby expressly incorporated by reference into the present application.

TECHNICAL FIELD

The present disclosure relates to an invention capable of providing a voice recognition service through a plurality of artificial intelligence (AI) agents.

BACKGROUND ART

A digital TV service over a wired or wireless communication network has been common. Various services, which have been never provided based on a conventional analog broadcasting service, may be provided based on the digital TV service.

For example, Internet protocol television (IPTV) or a smart TV, which is a kind of the digital TV service, provides bi-directionality allowing a user to actively select the type of a viewing program, or a viewing time. The IPTV or the smart TV service may provide various additional services, for example, an Internet search service, a home shopping service, or an online game service, based on bi-directionality.

Recently, a technology of recognizing the utterance of a user through the AI and of providing a voice recognition service matched to the utterance of the user has been introduced.

In general, the display device has been equipped with a plurality of artificial intelligence (AI) agents capable of providing a voice recognition service.

However, when voice for voice recognition is uttered, it is difficult for a user to easily recognize an AI agent to provide an intent fulfillment result based on the utterance of the user.

To activate the voice recognition service, the user first utters an operating command. Thereafter, the user utters the starting command for controlling the operation of the display device.

Conventionally, when an AI agent matched to the starting command is different from an AI agent performing the operation in response to the operating command, the user may confuse between starting commands to be uttered.

In addition, conventionally, as AI agents are not distinguished to support the voice recognition service with respect to each of a plurality of languages, the user may feel bothered in using voice recognition service.

DISCLOSURE

Technical Problem

The present disclosure is to enable a user to easily recognize that an AI agent matched to the operating command is different from an AI agent matched to the starting command, under the environment of multiple AI agents.

The present disclosure is to provide a menu for identifying an AI agent which is able to be supported with respect to each of a plurality of languages, under multiple AI agent environments.

Technical Solution

According to an embodiment of the present disclosure, a display device for providing a voice recognition service may include a display unit, a network interface unit to communicate with a natural language process server, and a control unit to receive a starting command, identify a first AI agent matched to the starting command, which is received, display, onto the display unit, a first UI for representing the first AI agent, which is identified, receive an operating command, and change the first UI to a second UI for representing a second AI agent, when an AI agent matched to the operating command, which is received, is the second AI agent different from the first AI agent.

According to an embodiment of the present disclosure, an artificial intelligence (AI) system for providing a voice recognition service may include a display device to receive a starting command, identify a first AI agent matched to the starting command, which is received, display a first UI for representing the first AI agent, which is identified, receive an operating command, and change the first UI to a second UI for representing a second AI agent, when an AI agent matched to the operating command, which is received, is the second AI agent different from the first AI agent, and a natural language process server to receive voice data corresponding to the operating command from the display device, convert the voice data, which is received, into text data, and identify an intent fulfillment result by analyzing an intent of the text data which is converted, and an AI agent which provides the intent fulfillment result.

Advantageous Effects

According to various embodiments of the present disclosure, the user may easily recognize the subject which provides the recognition result of the utterance, and then may utter the starting command without confusion.

In addition, according to an embodiment of the present disclosure, the form of supporting the voice recognition service for each of the plurality of languages may be easily recognized through the menu for identifying the AI agent which is able to be supported for the plurality of languages.

DESCRIPTION OF DRAWINGS

FIGS. 11 and 12 are views illustrating the process of notifying the change of an AI agent, when the AI agent is changed in response to the operating command uttered by the user, according to still another embodiment of the present disclosure.

FIG. 13 is a view illustrating a table showing the correspondence among a starting word uttered by a user, and a UI and an intent fulfillment result which are displayed depending on a search word.

FIG. 14 illustrates an AI table obtained by organizing AI agents supported for a plurality of languages according to an embodiment of the present disclosure.

BEST MODE

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present disclosure, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
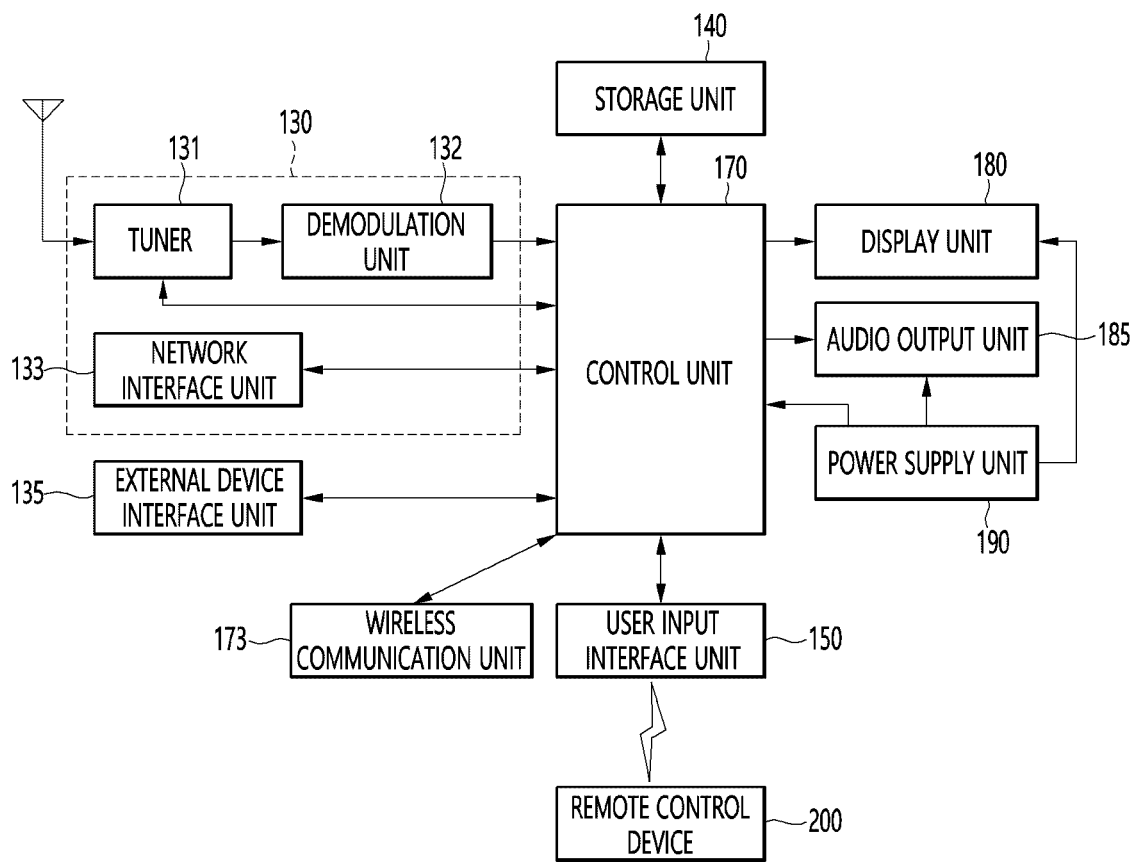
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception unit 130, an external device interface unit 135, a storage unit 140, a user interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one an image or audio output from an external device that is wirelessly or wiredly connected to the display device 100 and deliver it to the control unit 170. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A sound signal of an external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system, but this is just exemplary.

The network interface unit 133 can provide an interface for connecting the display device 100 to a wired/wireless network including the Internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, the network interface unit 133 can transmit or receive data to or from a corresponding server by accessing a predetermined webpage through the network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user interface unit 150 can deliver signals input by a user to the control unit 170 or deliver signals from the control unit 170 to a user. For example, the user interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user interface unit 150 can deliver, to the control unit 170, control signals input from local keys (not shown) such as a power key, a channel key, a volume key, and a setting key.

Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135.

Besides that, the control unit 170 can control overall operations in the display device 100.

Additionally, the control unit 170 can control the display device 100 by a user command or internal program input through the user interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present disclosure described below can be performed by one of the display device described with reference to FIG. 1, an image processing device such as the separated set-top box, and a content playback device including the display unit 180 and the audio output unit 185.

Figure 2:
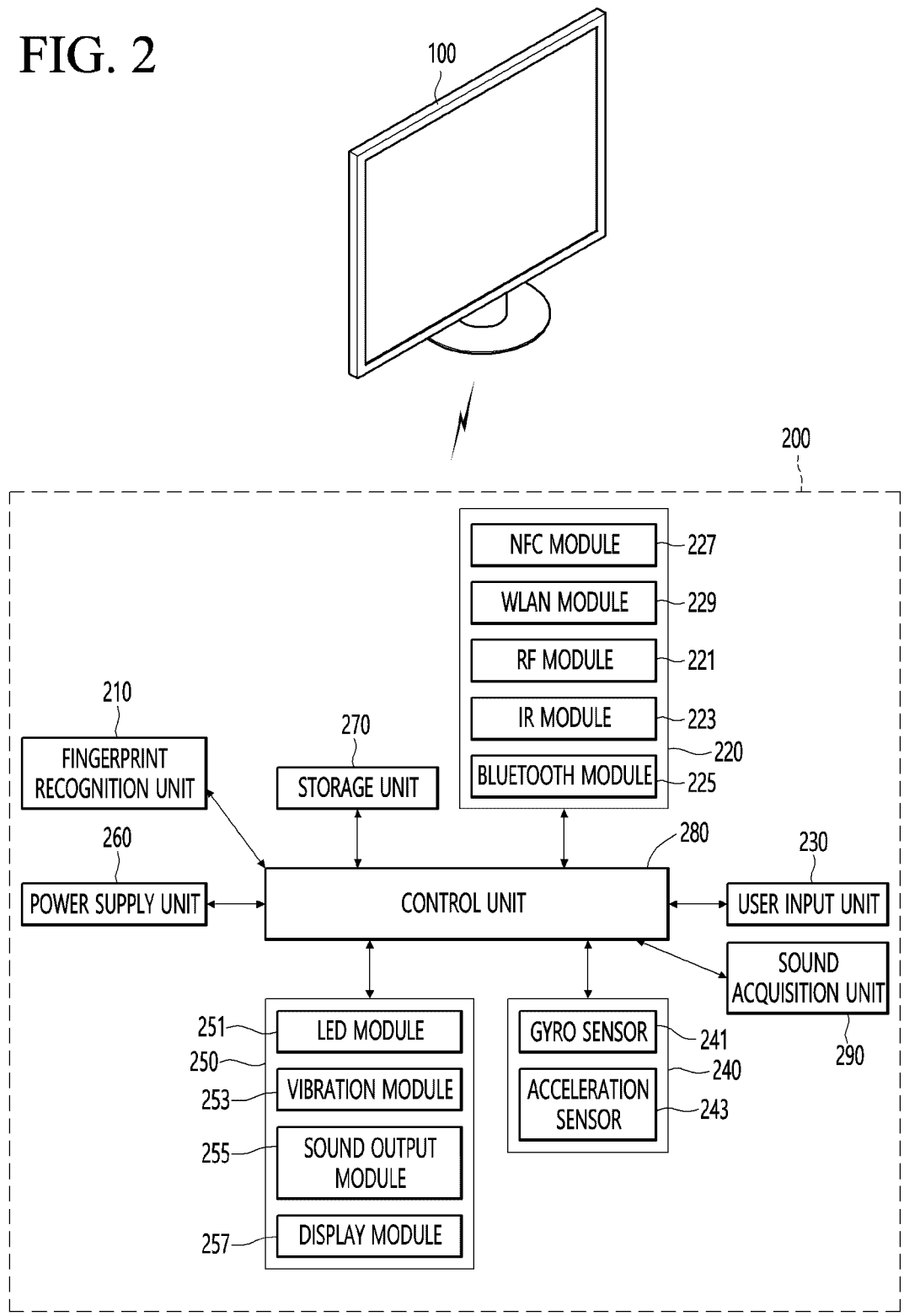
FIG. 2 is a block diagram illustrating a remote control device according to an embodiment of the present disclosure.
Figure 3:
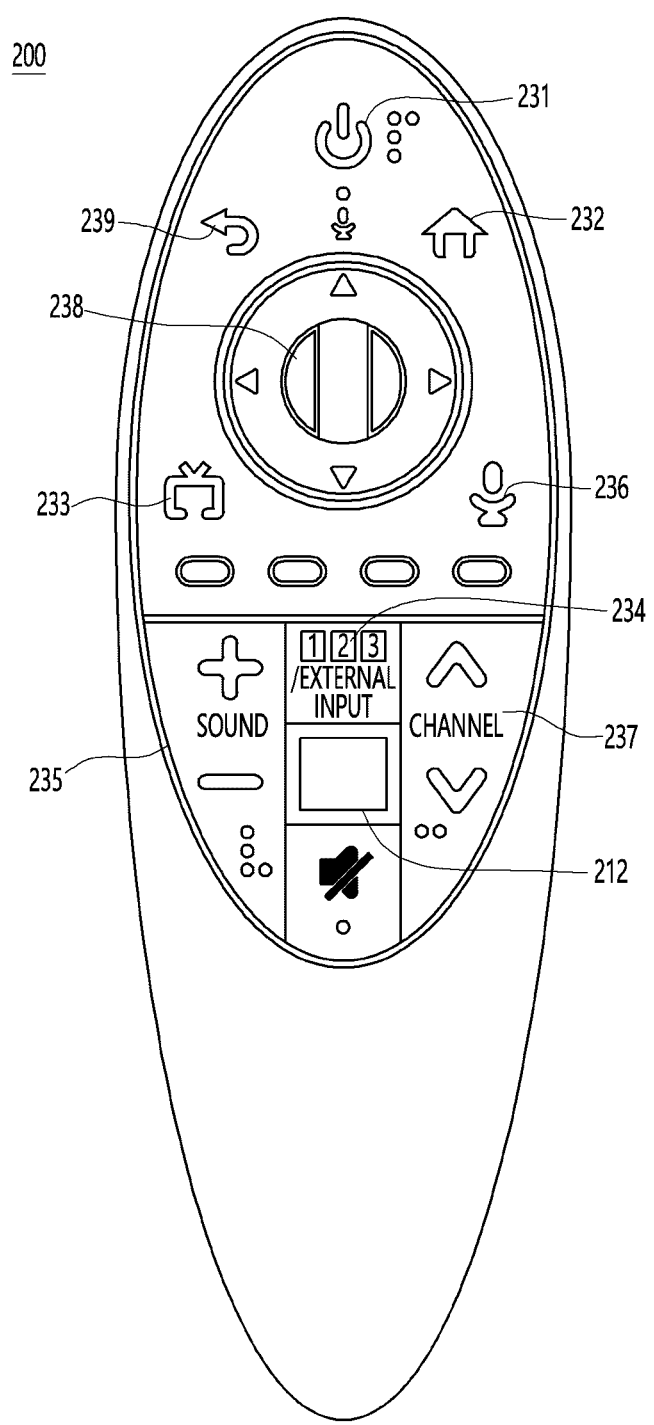
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present disclosure.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

The following description will be described with reference to FIG. 2 again.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present disclosure.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals in response to manipulation of the user input unit 230 or image or voice signals corresponding to signals transmitted from the display device 100. A user can recognize whether the user input unit 230 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to control of the remote control device 200. The control unit 280 can transmit a signal corresponding to a predetermined key manipulation of the user input unit 230 or a signal corresponding to movement of the remote control device 200 sensed by the sensor unit 240 to the display device 100 through the wireless communication unit 220.

Additionally, the sound acquisition unit 290 of the remote control device 200 can obtain voice.

The sound acquisition unit 290 can include at least one microphone and obtain voice through the microphone 291.

The following description will be described with reference to FIG. 2 again.

Figure 4:
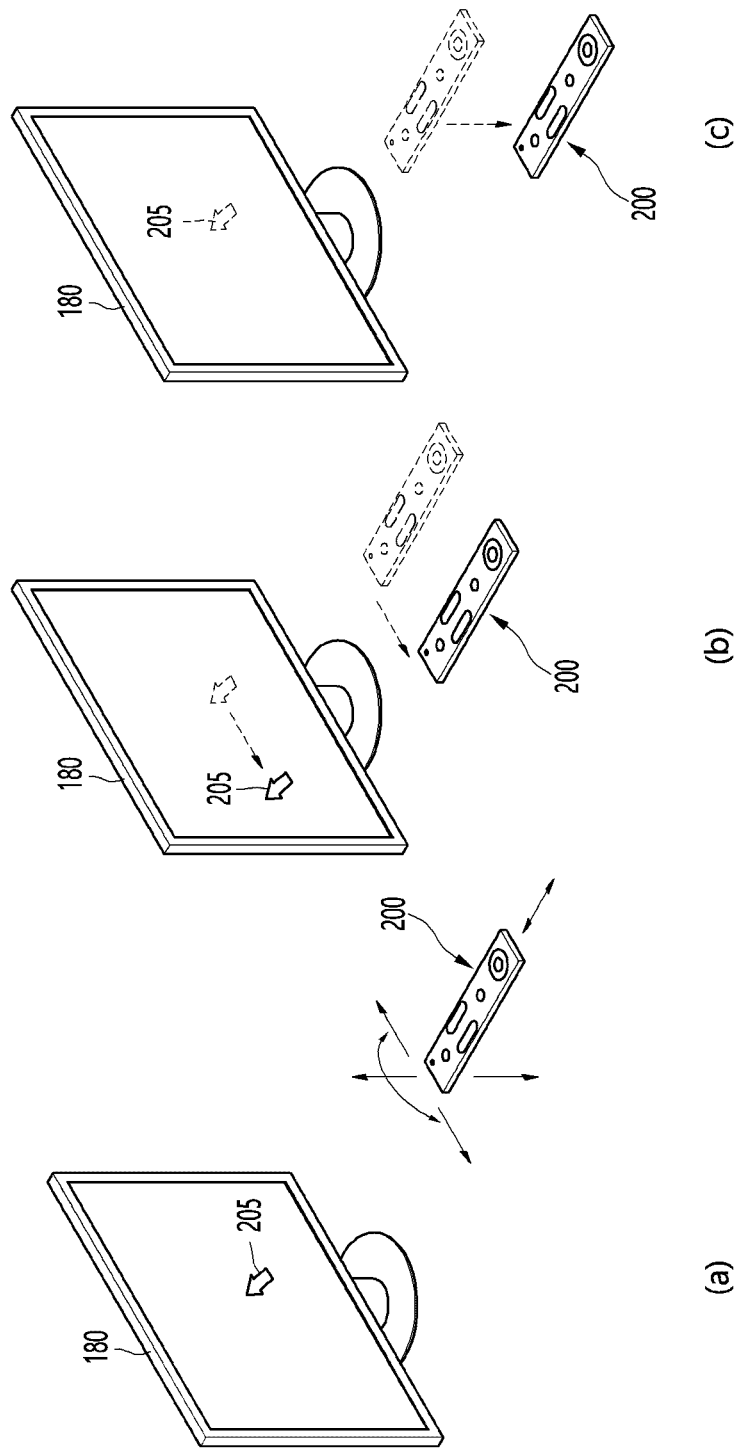
FIG. 4 is a view of utilizing a remote control device according to an embodiment of the present disclosure.

FIG. 4 is a view of utilizing a remote control device according to an embodiment of the present disclosure.

FIG. 4(a) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(b) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(c) illustrates that while a specific button in the remote control device 200 is pressed, a user moves the remote control device 200 away from the display unit 180. Thus, a selection area in the display unit 180 corresponding to the pointer 205 can be zoomed in and displayed larger.

On the other hand, if a user moves the remote control device 200 close to the display unit 180, a selection area in the display unit 180 corresponding to the pointer 205 can be zoomed out and displayed in a reduced size.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. That is, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
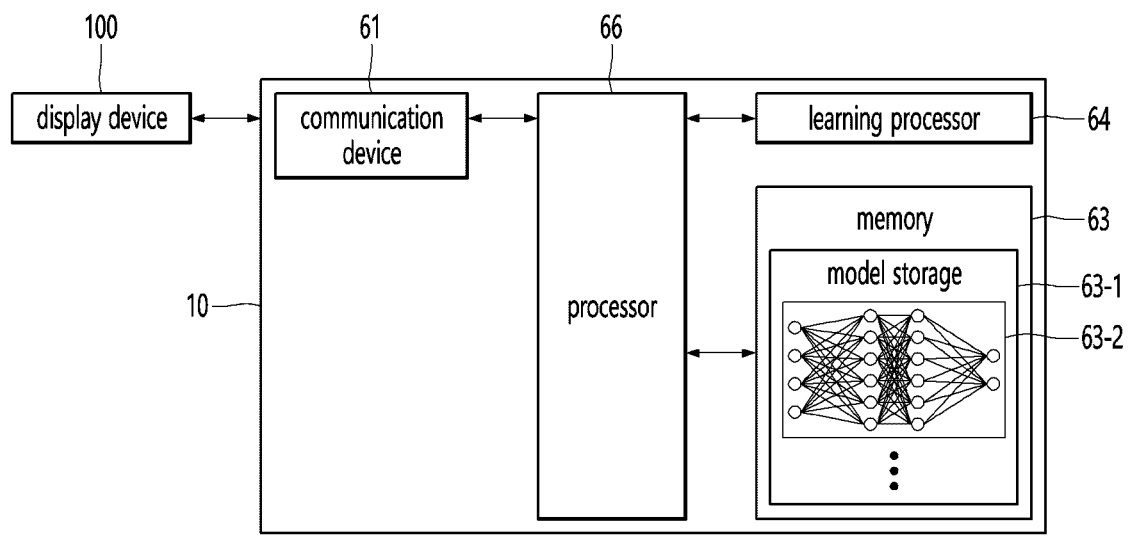
FIG. 5 is a block diagram illustrating the configuration of an AI server according to an embodiment of the present disclosure.

FIG. 5 is a block diagram illustrating the configuration of an AI server according to an embodiment of the present disclosure.

Referring to FIG. 5, an artificial intelligence (AI) server 10 may refer to a device to train an artificial neural network using a machine learning algorithm or a device employing the artificial neural network.

In this case, the AI server 10 may include a plurality of servers to perform distribution processing, and may be defined in the form of a 5G network. In this case, the AI server 10 is included in the display device 100 as a component, and may perform at least a portion of AI processing together.

The AI server 10 may include a communication device 61, a memory 63, a learning processor 64, and a processor 66.

The communication device 61 may transmit or receive data together with an external device such as the display device 100.

The memory 63 may include a model storage 63-1. The model storage 63-1 may store a model (or an artificial neural network) which is being trained or has been trained through the learning processor 64.

The learning processor 64 may train an artificial neural network 63-2 using learning data. The learning model may be used mounted in the AI server 10 of the ANN or may be used mounted in an external device such as the display device 100.

The learning model may be implemented through hardware, software, or the combination of hardware and software. When a portion or an entire portion of the learning model is implemented through software, at least one instruction constituting the learning model may be stored in the memory 63.

The processor 66 may infer a result value of novel input data using the learning model, and may make a response or a control command based on the inferred result value.

Figure 6:
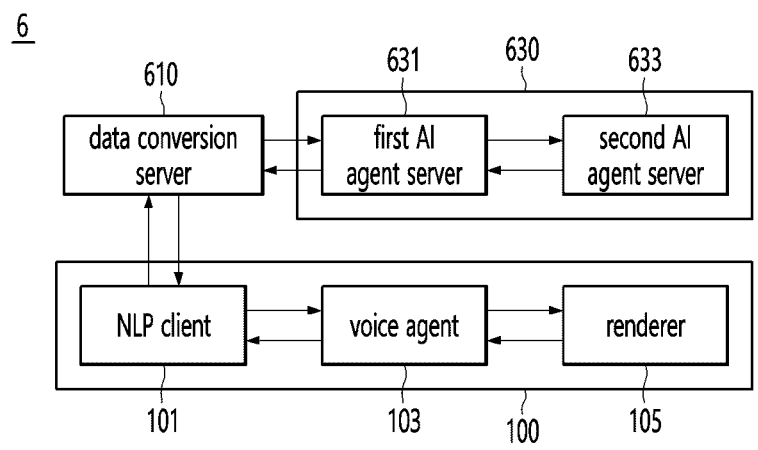
FIG. 6 is a view illustrating the configuration of an AI system according to another embodiment of the present disclosure.

FIG. 6 is a view illustrating the configuration of an AI system according to another embodiment of the present disclosure.

Referring to FIG. 6, the AI system 6 may include the display device 100, a data conversion server 610, and an NLP server 630.

The display device 100 may transmit voice data, which corresponds to a voice command uttered by a user, to the data conversion server 610.

The data conversion server 610 may receive the voice data from the display device 100. The data conversion server 610 may convert the received voice data into text data.

The data conversion server 610 may convert an intent result in the text form, which is received from the NLP server 630, into voice data in an audio form, and may transmit the converted voice data to the display device 100.

The data conversion server 610 may transmit the voice data, which indicates the change in an AI agent, to the display device 100.

The natural language process (NLP) server 630 may include a first AI agent server 631 and a second AI agent server 633.

The NLP server 630 may receive text data from the data conversion server 610, and may analyze the intent of the received text data by using a natural language processing engine.

The NLP server 630 may include at least one AI agent server.

For example, the NLP server 630 may include a first AI agent server 631 and a second AI agent server 633.

The first AI agent server 631 may be a server to provide a natural language processing service through manufacturers other than manufacturers of the display device 100.

The second AI agent server 633 may be a server to provide a natural language processing service through the manufacturers of the display device 100.

Each of the first AI agent server 631 and the second AI agent server 633 may include components of the AI server 10 illustrated in FIG. 5.

The data conversion server 610 may transmit the text data to the first AI agent server 631.

The first AI agent server 631 may acquire the intent of the text data, and may determine whether the operation corresponding to the acquired intent is processed.

The first AI agent server 631 may acquire an intent analyzing result corresponding to the intent, when it is determined that the operation corresponding to the acquired intent is processed.

The first AI agent server 631 may transmit the intent of the text data to the second AI agent server 633, when it is determined that the operation corresponding to the acquired intent cannot be processed.

The second AI agent server 633 may acquire an intent analysis result corresponding to the received intent of the text data, and may transmit the acquired intent analysis result to the first AI agent server 631.

The first AI agent server 631 may transmit the intent analysis result to the data conversion server 610.

The data conversion server 610 may transmit the intent analysis result to an NLP client 101 of the display device 100.

The display device 100 may further include the NLP client 101, a voice agent 103, and a renderer 105.

The NLP client 101, the voice agent 103, and the renderer 105 may be included in the control unit 170 illustrated in FIG. 1.

For another example, the NLP client 101 may include a network interface unit 133 illustrated in FIG. 1.

The NLP client 101 may communicate with the data conversion server 610.

The voice agent 103 may receive a signal for entering into a voice recognition mode, from the remote control device 200, and may activate the operation of a microphone provided in the display device 100, in response to the received signal.

The voice agent 103 may transmit, to the NLP client 101, a voice command received from the microphone provided in the display device 100, or a voice command received from the remote control device 200.

The voice agent 103 may receive the intent analysis result or the search information, received by the NLP client 103, from the NLP server 630.

The voice agent 103 may execute an application, based on information on the intent analysis result, or may perform a function corresponding to a button key of the remote control device 200.

The voice agent 103 may be included in components of the NLP client 103.

The renderer 105 may generate an UI through a GUI module to display the received search information on the display unit 180, and may output the generated UI to the display unit 180.

Figure 7:
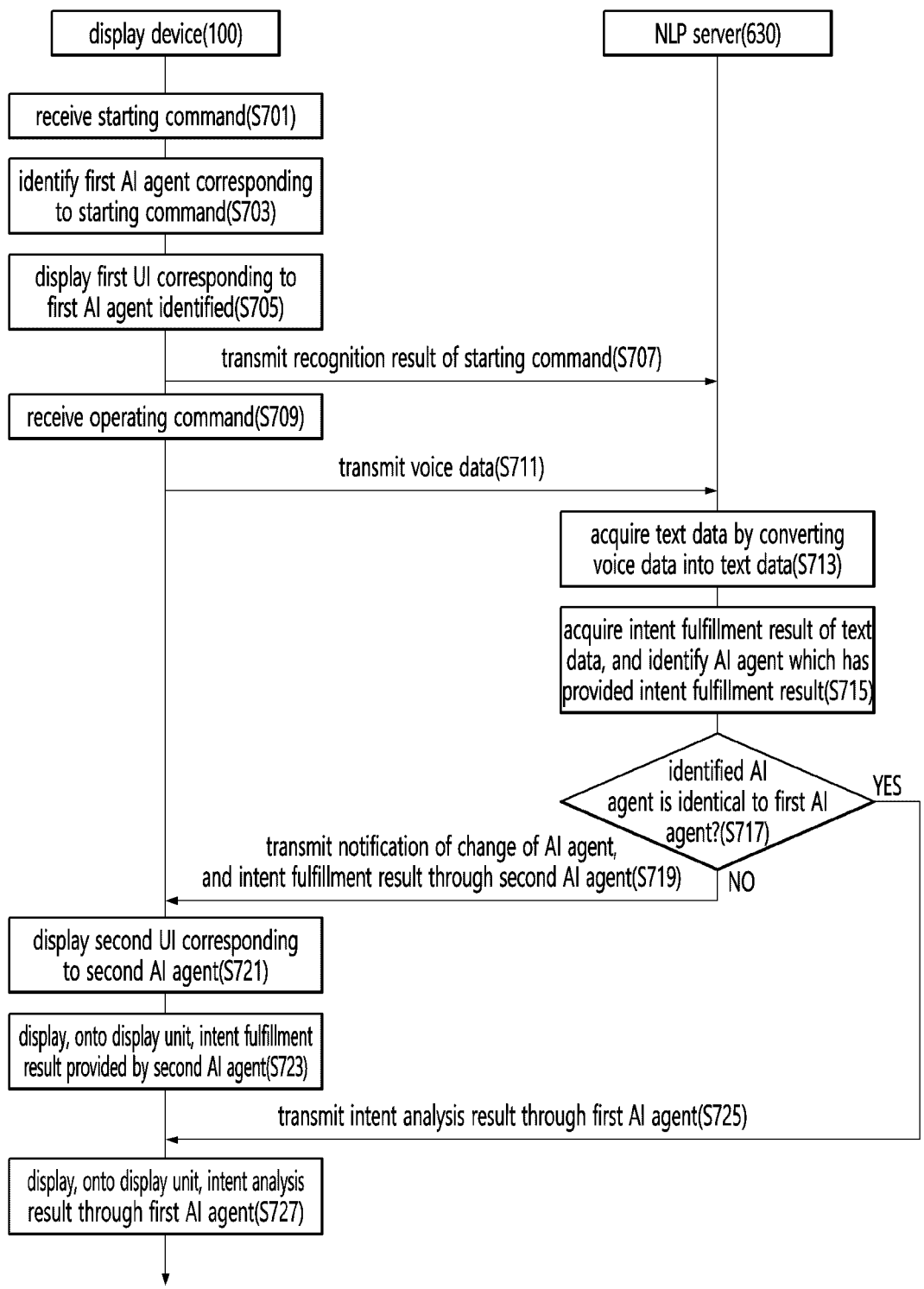
FIG. 7 is a ladder diagram for the operating method of an AI system according to an embodiment of the disclosure.

FIG. 7 is a ladder diagram for the operating method of an AI system, according to an embodiment of the disclosure.

Hereinafter, the operating method of a system according to an embodiment of the present disclosure will be described with reference to FIGS. 5 and 6.

Referring to FIG. 7, the control unit 170 of the display device 100 receives a starting command uttered by the user (S701).

According to an embodiment, the display device 100 may include a microphone, and may receive a voice command of a user through the microphone.

According to another embodiment, the wireless communication unit 173 of the display device 100 may receive the voice command from the remote control device 200. In other words, the user may utter the voice command through the remote control device 200, and may send the uttered voice command to the display device 100 through the remote control device 200.

The starting command may be a command to activate a voice recognition service.

The starting command may be varied depending on an AI agent to provide the voice recognition service. The AI agent may be hardware or software which recognizes the voice command uttered by the user, and provide information based on the intent of the recognized voice command.

The display device 100 may include a plurality of AI agents.

The control unit 170 of the display device 100 may identify the first AI agent corresponding to the starting command (S703).

The control unit 170 may receive the starting command, and may identify the AI agent corresponding to the starting command, when the received starting command is a command previously stored in the storage unit 140.

The AIG agent may be a subject which provides a voice recognition service. A plurality of AI agents may correspond to a plurality of starting commands.

The storage unit 140 may store the plurality of starting commands and the plurality of AI agents corresponding to the plurality of starting commands.

The control unit 170 of the display device 100 displays the first UI corresponding to the first AI agent (S705).

The first user interface (UI) may be an identifier indicating that the first AI agent provides the voice recognition service.

The first UI may show an origin of the AI agent providing the voice recognition service.

When the control unit 170 identifies the first AI agent through the recognized starting command, the control unit 170 may display, onto the display unit 180, the first UI showing that the voice recognition service may be provided by the first AI agent.

When the control unit 170 identifies the second AI agent through the recognized starting command, the control unit 170 may display, onto the display unit 180, the second UI, which shows that the voice recognition service may be provided by the second AI agent.

The details thereof will be described with reference to FIGS. 8A and 8B.

Figure 8A:
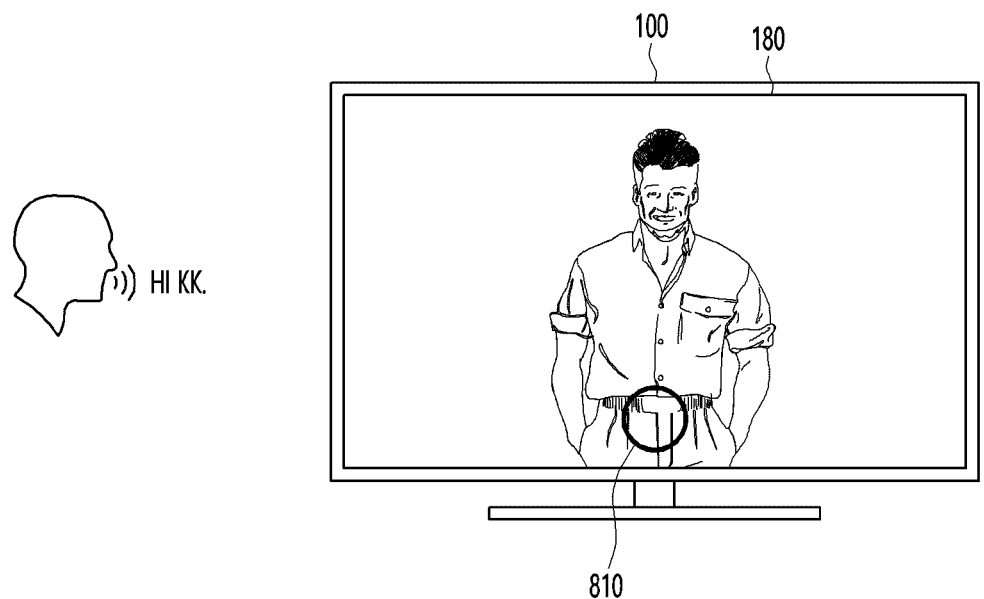
FIGS. 8A and 8B are views illustrating a method for showing an AI agent depending on the recognition of the starting command according to an embodiment of the present disclosure.
Figure 8B:
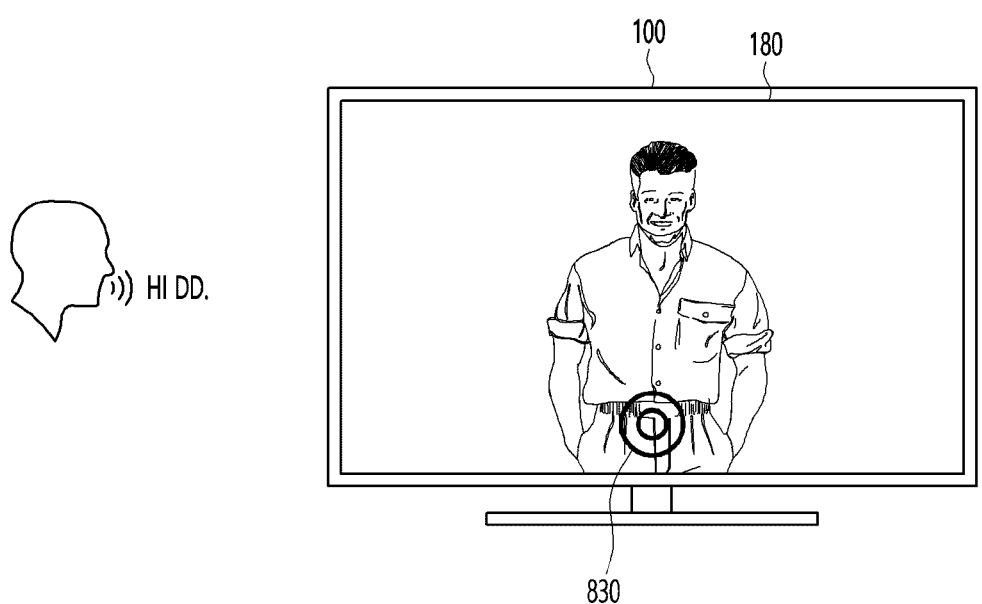

FIGS. 8A and 8B are views illustrating a method for showing an AI agent depending on the recognition of the starting command, according to an embodiment of the present disclosure.

Referring to FIG. 8A, the user may utter a first starting command (HI KK).

The display device 100 may recognize the first starting command, and may identify the first AI agent corresponding to the recognized first starting command. The display device 100 may display, onto the display unit 180, a first UI 810 showing that the voice recognition service may be provided through the identified first AI agent.

The first UI 810 may include an icon having the form of a microphone and a text for inducing the utterance of the user.

The display device 100 may display the first UI 810 while expressing the name of the first AI agent through the audio output unit 185.

Accordingly, the user may recognize the subject which provides the voice recognition service.

Referring to FIG. 8B, the user may utter a second starting command (OK DO).

The display device 100 may recognize the second starting command and may identify the second AI agent corresponding to the second starting command. The display device 100 may display, onto the display device 180, a second UI 830 showing that the voice recognition service may be provided by the identified second AI agent.

The display device 100 may display the second UI 830 while expressing the name of the first AI agent through the audio output unit 185.

The second UI 830 may include an icon having the form of a microphone and a text for inducing the utterance of the user.

The following description will be made with reference to FIG. 7 again.

The control unit 170 of the display device 100 may transmit the recognition result of the starting command to the NLP server 630 through a network interface unit 133 (S707).

The recognition result of the starting command may include identification information for identifying the AI agent corresponding to the starting command.

The identification information may include all information, such as the name of the AI agent, for identifying the AI agent.

The NLP server 639 may store the recognition result of the starting command received from the display device 100.

Thereafter, the control unit 170 of the display device 100 may receive an operating command uttered by the user (S709)

The operating command may be a command for controlling a specific operation of the display device 100, after activating the voice recognition function.

For example, the operating command may be a command for requesting for searching for information on a program or a weather.

The control unit 170 of the display device 100 transmits voice data corresponding to the operating command to the NLP server 630 through the network interface unit 133 (S711).

The NLP client 101 may transmit the voice data corresponding to the operating command to the NLP server 630. In this case, the NLP server 630 is assumed as including the data conversion server 610.

The NLP server 630 acquires the text data by converting voice data received from the display device 100 into text data (S713).

The NLP server 630 acquires an intent fulfillment result of the text data, and identifies an AI agent which has provided the intent fulfillment result (S715).

A first AI agent server 631 of the NLP server 630 may acquire the intent of text data received from the data conversion server 610.

When the first AI agent server 631 determines that the intent of the text data is not able to be processed, the first AI agent server 631 may transmit the intent of the text data to the second AI agent server 633.

The second AI agent server 631 may acquire an intent fulfillment result, when the second AI agent server 631 determines that the intent of the text data is processed by the second AI agent server 631.

When the first AI agent server 631 determines that the intent of the text is able to be processed by the first AI agent server 631, the first AI agent server 631 may acquire the fulfillment result of the intent.

The NLP server 630 may detect an agent server, which acquires the intent fulfillment result, of the first AI agent server 631 and the second AI agent server 633.

The NLP server 630 determines whether the identified AI agent is identical to the first AI agent corresponding to the starting command (S717).

When the identified AI agent is not identical to the first AI agent, the NLP server 630 transmits an AI agent change notification, and the intent fulfillment result through the second AI agent, to the display device 100 (S719).

In other words, the NLP server 630 may determine the AI agent, which is a subject, which processes the operating command, as being changed from the first AI agent to the second AI agent, when the identified AI agent is not identical to the first AI agent.

The NLP server 630 may transmit, to the display device 100, the notification of that the AI agent is changed from the first AI agent to the second AI agent, and the intent fulfillment result acquired through the second AI agent.

The control unit 170 of the display device 100 displays, onto the display unit 180, the second UI corresponding to the second AI agent, based on the notification of the change of the received AI agent (S721).

The control unit 170 may determine the subject, which provides the voice recognition service, as being changed, based on an AI agent change notification. The control unit 170 may change the first UI to the second UI for identifying the second AI agent.

In addition, the control unit 170 may output, through the audio output unit 185, an audio signal indicating that the subject which provides the voice recognition service is changed from the first AI agent to the second AI agent.

The user may easily recognize the change of the AI agent to provide the voice recognition service, through the second UI.

The control unit 170 of the display device 100 may display, onto the display unit 180, the intent fulfillment result provided by the second AI agent (S723).

The control unit 170 may display, onto the display unit 180, the intent fulfillment result provided by the second AI agent, after displaying the second UI.

Meanwhile, the NLP server 630 transmits, to the display device 100, an intent analysis result through the first AI agent, when the first AI agent is identical to the second AI agent (S725).

The control unit 170 of the display device 100 displays, onto the display unit 180, the intent analysis result through the first AI agent (S727).

Figure 9:
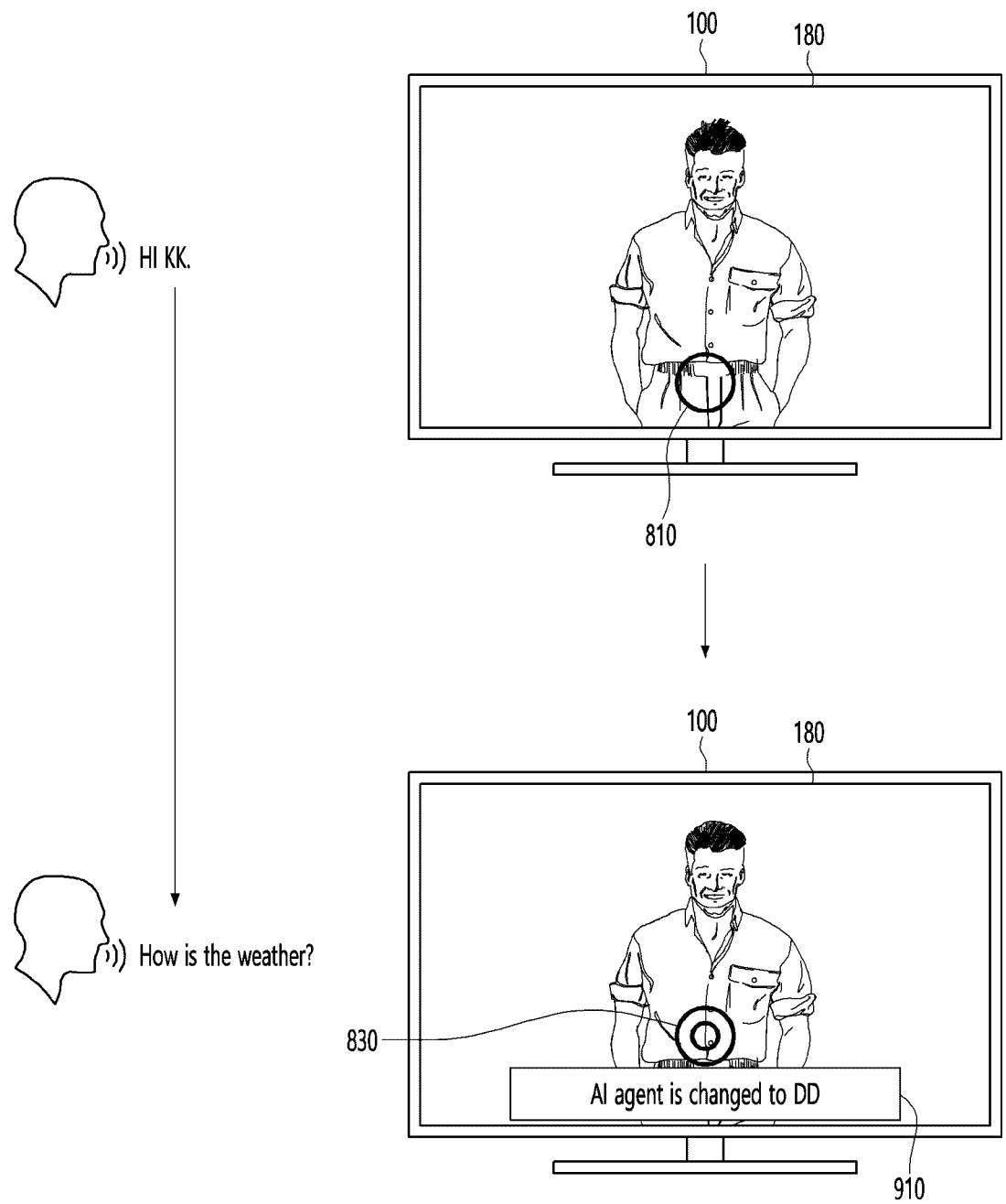
FIGS. 9 and 10 are views illustrating the process of notifying the change of the AI agent, when the AI agent is changed in response to the operating command uttered by the user according to an embodiment of the present disclosure.
Figure 10:
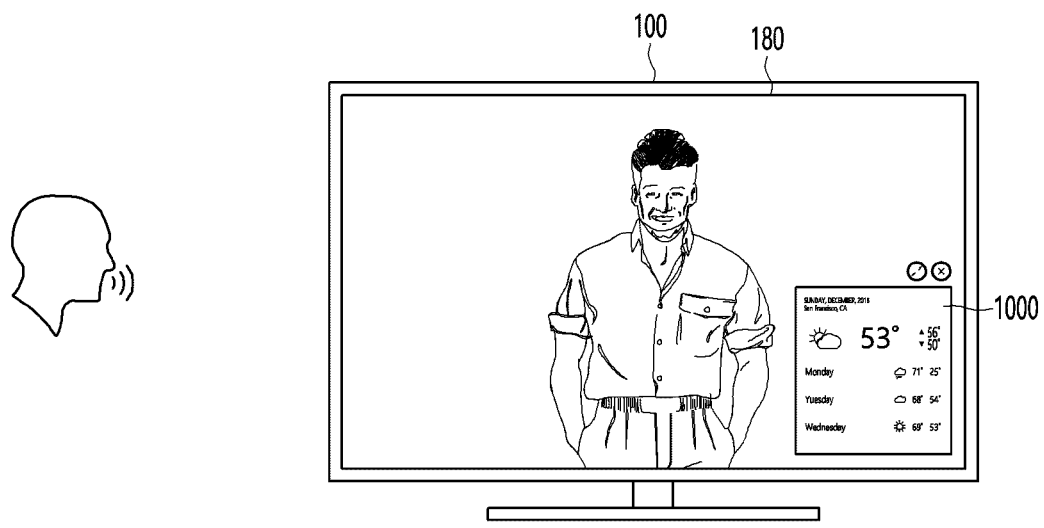

FIGS. 9 and 10 are views illustrating the process of notifying the change of the AI agent, when the AI agent is changed in response to the operating command uttered by the user, according to an embodiment of the present disclosure.

Referring to FIG. 9, the user utters the starting command <HI KK>.

In this case, 'KK' may be the name of the first AI agent. The display device 100 may recognize the starting command uttered by the user, and may identify the first AI agent corresponding to the recognized starting command.

The display device 100 may display, onto the display unit 180, the first UI 810 showing that the voice recognition service is provided through the first AI agent.

The display device 100 may transmit, to the NLP server 630, the recognition result of the starting command, which includes identification information of the first AI agent identified.

Thereafter, the user utters <How is the weather> which is the operating command.

The display device 100 may transmit the voice data, which corresponds to the operating command, to the NLP SERVER 630.

The NLP server 630 may analyze the intent of the voice data, and may determine the AI agent which processes the analyzed intent.

For example, the first AI agent may not process the intent of requesting for the weather information, but may process the intent of requesting for searching for a film. In addition, the second AI agent may process the intent of requesting the weather information, but may not process the intent of requesting searching for the film.

The NLP server 630 may detect that the intent of the operating command is the request for the weather information, and may determine the second AI agent, which is able to search for the weather information, as an agent appropriate to processing the intent.

In this case, the NLP server 630 may determine the subject, which provides the voice recognition service, as being changed from the first AI agent to the second AI agent.

The NLP server 630 may transmit, to the display device 100, the weather information acquired by the second AI agent corresponding to the second AI agent and a notification of indicating that the AI agent is changed.

The display device 100 may display, onto the display unit 180, the second UI 830 for identifying the second AI agent and a notification 910 indicating that the AI agent is changed from the first AI agent to the second AI agent, in response to the operating command, as illustrated in FIG. 9. Simultaneously, the display device 100 may output, through the audio output unit 185, voice indicating that the AI agent is changed from the first AI agent to the second AI agent.

The second AI 830 may include the icon having the form of a microphone and indicating the origin of the second AI agent.

A user may easily recognize that the AI agent to provide the voice recognition service is changed, through the second UI 830 or the notification 910.

Meanwhile, the display device 100 may display, onto the display unit 180, weather information 1000 received from the NLP server 630, as illustrated in FIG. 10.

Accordingly, the user may receive the weather information 1000 corresponding to the operating command through the changed AI agent.

In other words, even though the AI agent corresponding to the operating command uttered by the user is different from the AI agent corresponding to the starting command, the user may receive information based on the intent of the operating command uttered.

Figure 11:
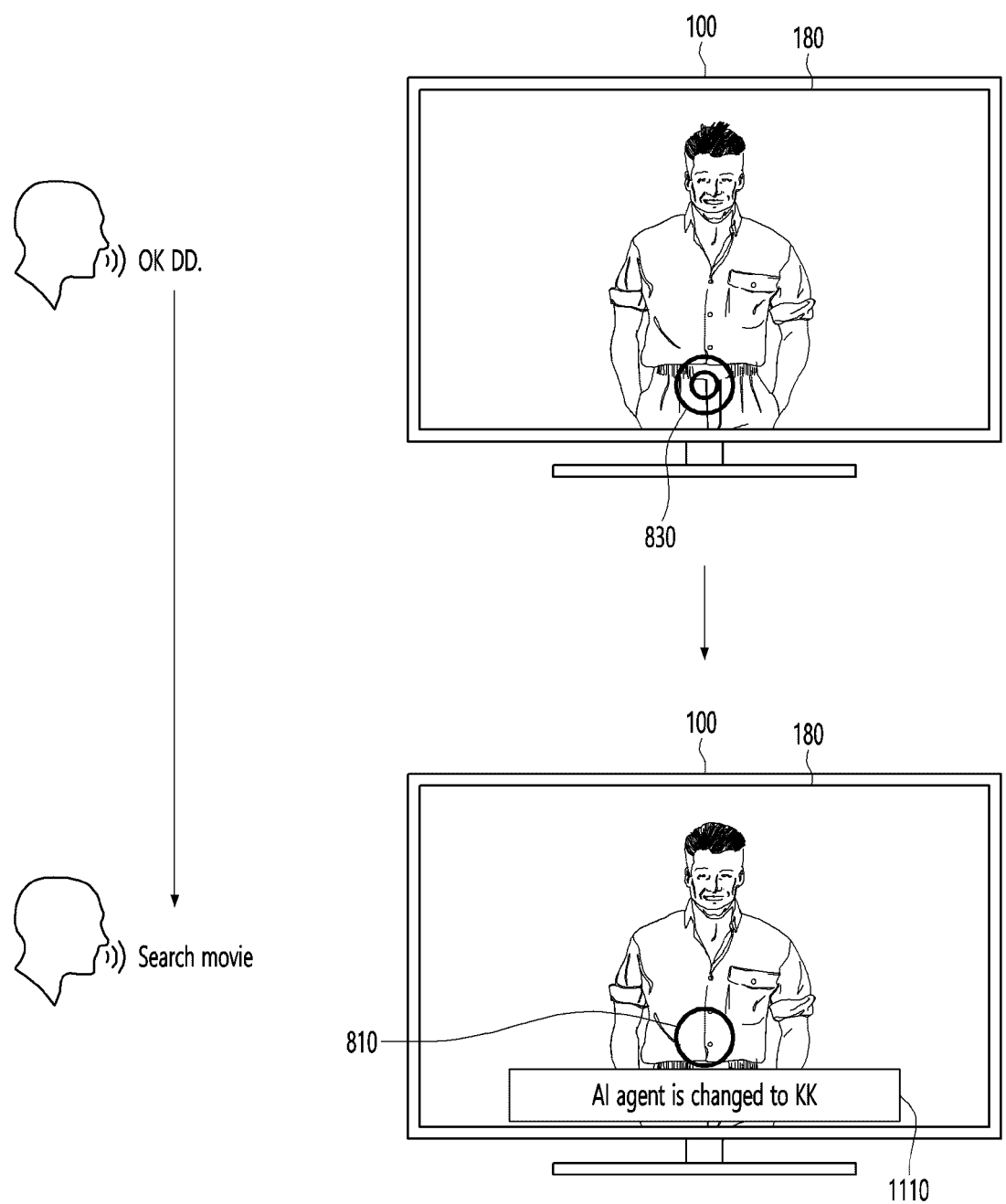

FIGS. 11 and 12 are views illustrating the process of notifying the change of the AI agent, when the AI agent is changed in response to the operating command uttered by the user, according to still another embodiment of the present disclosure.

First, referring to FIG. 11, the user utters "OK DD" which is the starting command.

'DD' may be the name of the second AI agent. The display device 100 may recognize the starting command uttered by the user, and may identify the second AI agent corresponding to the recognized starting command.

The display device 100 may display, onto the display unit 180, the second UI 830 indicating that the voice recognition service is provided through the second AI agent.

The display device 100 may transmit, to the NLP server 630, the recognition result of the starting command including the identification information of the identified second AI agent.

Thereafter, the user utters "Search Movie" which is the operating command.

The display device 100 may transmit, to the NLP server 630, voice data corresponding to the operating command.

The NLP server 630 may analyze the intent of the voice data, and may determine the AI agent which is able to process the analyzed intent.

For example, the first AI agent may not process the intent of requesting for the weather information, but may process the intent of requesting for searching for a film. The second AI agent may process the intent of requesting for the weather information, but may not process the intent of requesting for searching for the film.

The NLP server 630 may detect that the intent of the operating command is the request for searching for the film, and may determine the first AI agent, which is able to search for the film, as an agent appropriate to processing the intent.

In this case, the NLP server 630 may determine the subject, which provides the voice recognition service, as being changed from the second AI agent to the first AI agent.

The NLP server 630 may transmit, to the display device 100, film search information acquired by the first AI agent server 633 corresponding to the first AI agent and the notification of the change of the AI agent.

The display device 100 may display, onto the display unit 180, a first UI 810 for identifying the first AI agent and a notification 1110 for indicating that the AI agent is changed from the second AI agent to the first AI agent, in response to the operating command, as illustrated in FIG. 11. Simultaneously, the display device 100 may output, through the audio output unit 185, the voice for indicating the AI agent is changed from the second AI agent to the first AI agent.

The first UI 810 may include the icon having the form of a microphone, which indicates the origin of the first AI agent.

The user may easily recognize that the AI agent providing the voice recognition service is changed through the first UI 810 or the notification 1110.

Meanwhile, the display device 100 may display, onto the display unit 180, film search information 1200 received from the NLP server 630 as illustrated in FIG. 11.

Accordingly, the user may receive the film search information 1200 corresponding to the operating command through the changed AI agent.

In other words, even though the AI agent corresponding to the starting command uttered by the user is different from the AI agent corresponding to the operating command, the user may receive information based on the intent of the operating command uttered by the user.

FIG. 13 is a view illustrating a table showing the correspondence among a starting word uttered by a user, and a UI and an intent fulfillment result displayed depending on a search word.

The starting word and the search word described above may correspond to the operating command.

In addition, a microphone UI and an origin UI may correspond to any one of the first UI 810 and the second UI 830 described with reference to FIGS. 8A and 8B.

For example, a KK microphone UI may correspond to the first UI 810 and a DD microphone UI may correspond to the second UI 830.

A result card may be a card indicating an intent fulfillment result described with reference to FIG. 7.

In addition, it is assumed that the first AI agent may not search for the weather information, but may search for film information, and the second agent may search for the weather information, but may not search for the film information.

First, an operating word, which is <HI KK>, will be described below. In this case, the microphone UI may be a KK microphone UI to identify the identified first AI agent based on the starting word.

When the search word is <weather>, the first AI agent may not search for the weather information, but the second AI agent may search for the weather information. Accordingly, the KK microphone UI may be changed to a DD origin UI for identifying the second AI agent.

The result card may be provided through the second AI agent which is the origin for providing the weather information, and may be a card displayed on the display device 100.

Meanwhile, when the search ward is <Search Movies>, the first AI agent may not search for the film. Accordingly, the origin UI may be identical to the KK microphone UI for identifying an existing first AI agent.

The result card may be a card provided through the first AI agent which is an origin for providing the film search information.

Next, an operating word, which is <OK DD>, will be described below. In this case, the microphone UI may be a DD microphone UI for identifying the identified second AI agent identified based on the starting word.

When the search word is <weather>, the second AI agent may search for the weather information and the first AI agent may not search for the weather information. Accordingly, the DD microphone UI may be maintained to an origin UI.

The result card may be a card provided through the second AI agent which is the origin providing the film search information, and displayed on the display device 100.

Meanwhile, when the search word is <Search Movies>, the second AI agent may not search for the film, and the first AI agent may search for the film. Accordingly, the DD microphone UI may be changed to a KK origin UI for identifying the first AI agent.

The result card may be a card provided through the first AI agent which is the origin providing the film search information.

FIG. 14 illustrates an AI table obtained by organizing AI agents supported for a plurality of languages according to an embodiment of the present disclosure.

Referring to FIG. 14, an AI table 1400 is a table obtained by organizing services supported for the plurality of languages.

The AI table 1400 may be a table stored in the NLP server 630 or a service delivery platform (SDP) server described below.

The language item 1401 may be an item for representing a plurality of languages.

An STT item 1410 may be an item for representing whether an STT function for each language is supported. The STT function may be a function of converting the voice data to text data.

An NLP item 1430 may be an item for analyzing the intent of text data converted for each language.

A KK item 1450 may be an item for representing whether the voice recognition service is provided through the first AI agent (KK).

The DD item 1470 may be an item for representing whether the voice recognition service is provided through the second AI agent (DD).

The display device 100 may receive the AI table 1400 from the NLP server 630 or the SDP server through the NLP client 101, when powered on.

In other words, the display device 100 may read the AI table 1400 from the NLP server 630 or the SDP server and may store the AI table 1400, when powered on.

The display device 100 may display the received AI table 1400 onto a language menu.

Figure 15:
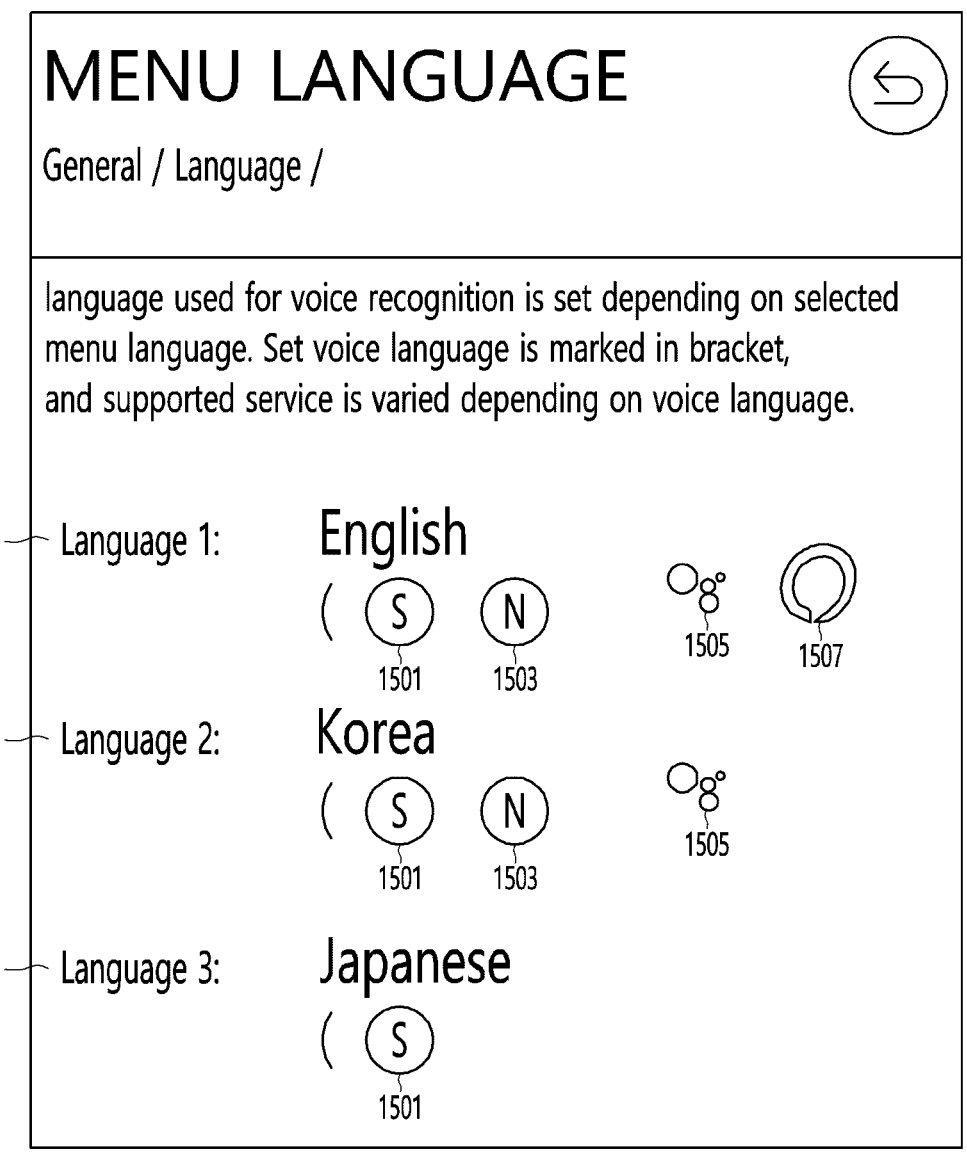
FIG. 15 is a view illustrating that a service, which is able to be supported with respect to each language, is displayed on a language menu by using an AI table, according to an embodiment of the present disclosure.

FIG. 15 is a view illustrating that a service which is able to be s supported for each language is displayed on a language menu by using an AI table, according to an embodiment of the present disclosure.

FIG. 15 illustrates a language menu 1500 for setting a language used in voice recognition.

The language menu 1500 may include a first language item 1510, a second language item 1530, and a third language item 1550.

Each of the first language item 1510, the second language item 1530, and the third language item 1550 may include an identifier for identifying a voice recognition support service which is able to be supported for each relevant language.

The display device 100 may display, on the language menu 1500, at least one identifier for representing a service which is able to be supported for the first language item 1510, the second language item 1530, and the third language item 1550.

For example, the first language item 1510 may include a first identifier 1501 for indicating that an STT function is able to be supported with respect to English, a second identifier 1503 for indicating that an NLP function is able to be supported, a third identifier 1505 for indicating that voice recognition service is able to be supported through the first AI agent, and a fourth identifier 1507 for indicating that the voice recognition service is able to be supported through the second AI agent.

The third identifier 1505 and the fourth identifier 1507 may represent origins to provide the voice recognition service.

The second language item 1530 may include the first identifier 1501 for indicating that the STT function is able to be supported, the second identifier 1503 for indicating that the NLP function is able to be supported, and the third identifier 1505 for indicating that the voice recognition service is able to be supported through the first AI agent.

The third language item 1550 may include the first identifier 1501 for indicating that the STT function is able to be supported.

The user may easily recognize the AI agent supported for each language, under multiple AI environments, through the language menu 1500.

In addition, the user may easily recognize, through the language menu 1500, whether only an STT function is supported for each language, or whether the STT function is supported for each language together with the NLP function.

The user may select the AI agent, which provides the voice recognition service, on the language menu 1500, as the third identifier 1505 and the fourth identifier 1507 is selected.

For example, when the third identifier 1505 is selected on the first language item 1510, the display device 100 may provide the voice recognition result of the voice command uttered by the user, through the first AI agent.

Figure 16:
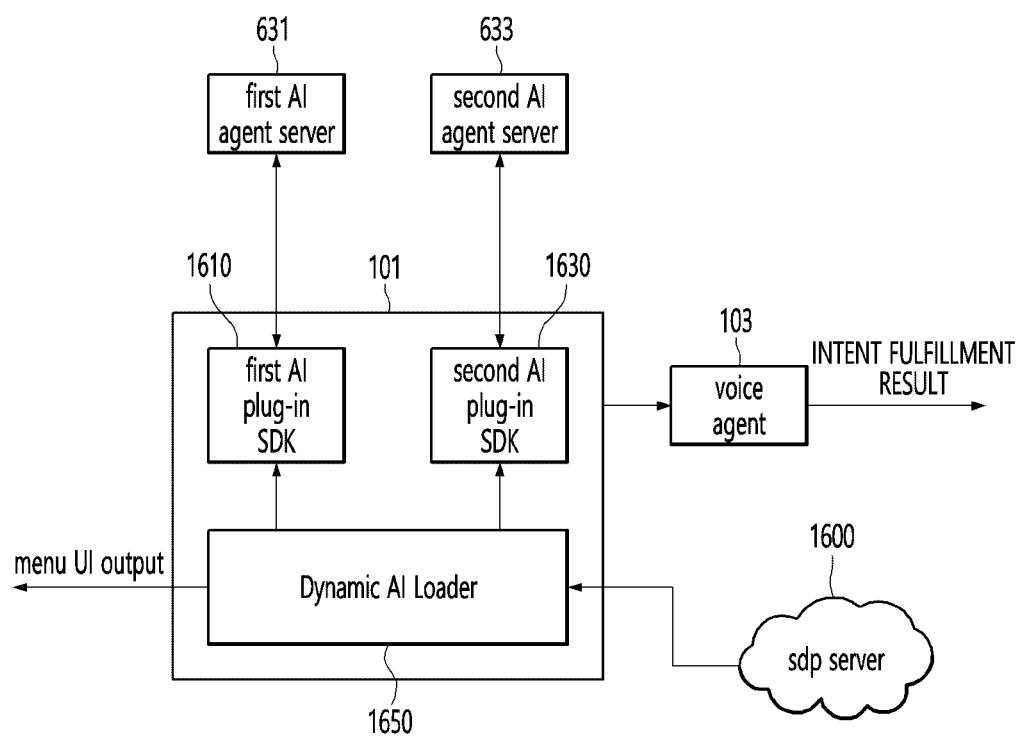
FIG. 16 is a view illustrating the procedure of outputting an intent fulfillment result corresponding to a voice command, depending on an AI agent selected on a language menu, according to an embodiment of the present disclosure.

FIG. 16 is a view illustrating the procedure of outputting an intent fulfillment result corresponding to a voice command, depending on an AI agent selected on a language menu, according to an embodiment of the present disclosure.

Referring to FIG. 16, the NLP client 101 may include a first AI plug-in SDK 1610, a second AI plug-in SDK 1630, and a dynamic AI loader 1650.

The first AI plug-in SDK 1610 may include software development tool collections used to provide the voice recognition service through the first AI agent server 631.

The first AI plug-in SDK 1610 may receive an intent fulfillment result corresponding to a voice command, from the first AI agent server 631.

The voice agent 103 may output the intent fulfillment result received from the first AI plug-in SDK 1610.

The second AI plug-in SDK 1630 may include software development tool collections used to provide a voice recognition service through the second AI agent server 633.

The second AI agent server 1630 may receive an intent fulfillment result corresponding to the voice command from the second AI agent server 633.

The voice agent 103 may output the intent fulfillment result received from the second AI plug-in SDK 1630.

The dynamic AI loader 1650 may read the AI table 1650 from the SDP server 1600.

The dynamic AI loader 1650 is connected to the SDP server 1600 to receive the AI table 1400, when the display device 100 is powered on.

The dynamic AI loader 1650 may output a menu UI by using the received AI table 1400. The menu UI may be a language menu 1500 illustrated in FIG. 15.

According to an embodiment of the present disclosure, the above-described method is able to be implemented in the form of a computer readable code. The computer readable medium includes, for example, a ROM, a RAM, a CD-ROM, a magnetic tape, a floppy disk, and an optical data storage device, and it is also implemented in the form of a carrier wave (e.g., data transmission through the Internet).

The display device described above is not limited to the configuration and the method according to embodiments described above, and the entire portion or the portion of embodiments are selectively combined and configured such that the embodiments may be variously modified.

The invention claimed is:

1. A display device for providing a voice recognition service, the display device comprising:
a microphone;
a display unit;
a network interface unit configured to communicate with a natural language process, NLP, server; and
a control unit configured to receive a starting command uttered by a user through the microphone, the starting command being a voice command to activate an AI agent providing a voice recognition service, identify a first AI agent corresponding to the received starting command, display, onto the display unit, a first UI for representing the identified first AI agent, transmit a recognition result including identification information for identifying the first AI agent corresponding to the starting command to the NLP server through the network interface unit, receive an operating command uttered by the user through the microphone, the operating command being for controlling a specific operation of the display device, transmit voice data corresponding to the operating command to the NLP server through the network interface unit, receive an AI agent change notification of that the AI agent is changed from the first AI agent to a second AI agent and an intent fulfillment result acquired through the second AI agent from the NLP server through the network interface unit, change the first UI to a second UI for representing the second AI agent based on the AI agent change notification, and display the second UI and the intent fulfillment result based on the AI agent change notification and the intent fulfillment result.

2. The display device of claim 1, wherein each of the first AI agent and the second AI agent is an agent to indicate a subject which provides the voice recognition service.

3. The display device of claim 1, wherein the control unit is configured to:
display, onto the display unit, a language menu including an identifier for identifying at least one AI agent supported for a relevant language, with respect to a plurality of languages, and
wherein each AI agent is an agent to indicate a subject which provides the voice recognition service.

4. The display device of claim 1, further comprising:
a speaker,
wherein the control unit is configured to:
output, through the speaker, voice for notifying that an agent providing the voice recognition service is changed from the first AI agent to the second AI agent.

5. An artificial intelligence (AI) system for providing a voice recognition service, the AI system comprising:
a display device configured to:
receive a starting command uttered by a user, the starting command being a voice command to activate an AI agent providing a voice recognition service, identify a first AI agent corresponding to the received starting command display a first UI for representing the identified first AI agent, receive an operating command uttered by the user, the operating command being for controlling a specific operation of the display device; and
a natural language process, NLP, server configured to:
receive voice data corresponding to the operating command from the display device, convert the received voice data into text data, acquire, by a first AI agent of the NLP server, a user intent of the text data, if the first AI agent determines that it is not able to process the user intent of the text data, transmit, by the first AI agent, the text data to a second AI agent of the NLP server and acquire, by the second AI agent of the NLP server, a user intent of the text data, receive an intent fulfillment result, identify which AI agent provides the intent fulfillment result, determine whether the identified AI agent is identical to the first AI agent corresponding to the starting command, and if the identified AI agent is not identical to the first AI agent, transmit an AI agent change notification and the intent fulfillment result to the display device,
wherein the display device is further configured to:
change the first UI to a second UI for representing the second AI agent, if the AI agent change notification is received, and display the second UI and the intent fulfillment result based on the AI agent change notification and the intent fulfillment result.

6. The AI system of claim 5, wherein each of the first AI agent and the second AI agent is an agent to indicate a subject which provides a voice recognition service.

7. The AI system of claim 5, wherein the display device transmits identification information of the first AI agent matched to the starting command to the natural language process server.

8. The AI system of claim 5, further comprising:
a speaker,
wherein the display device outputs, through the speaker, voice for notifying that an agent providing the voice recognition service is changed from the first AI agent to the second AI agent.

* * * * *